Richard W. May
Horst M. Schweighofer
INVENTORS

BY John J. Rogan
ATTORNEY

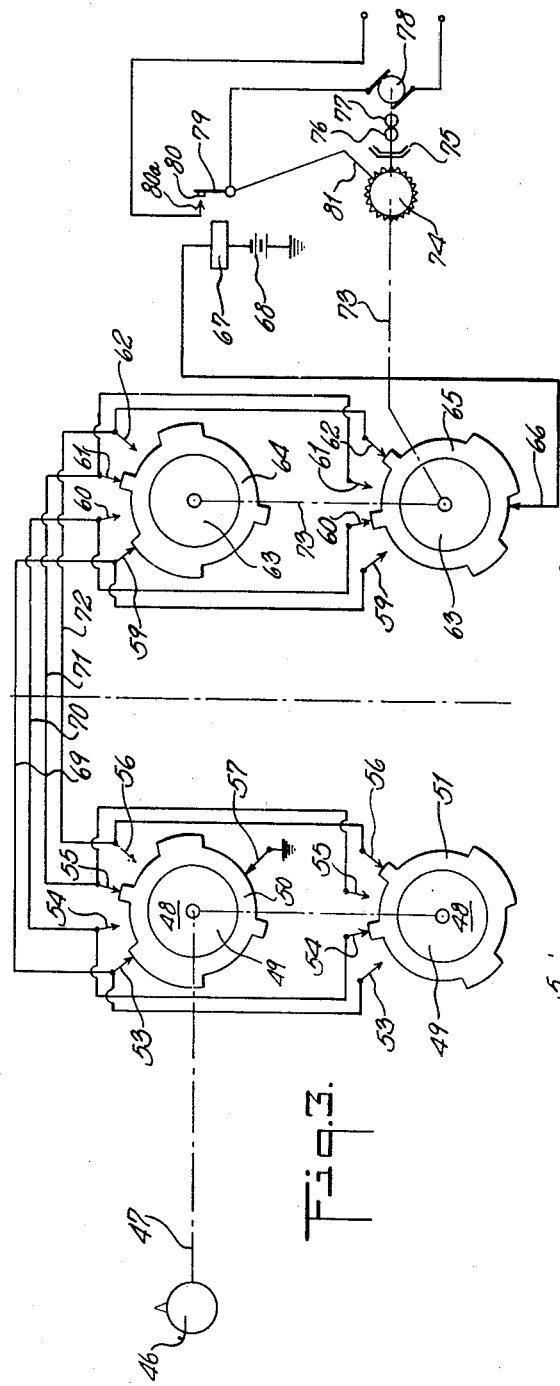

July 19, 1949.　　　　R. W. MAY ET AL　　　　2,476,673
SHAFT POSITIONING CONTROL SYSTEM

Filed Oct. 2, 1947　　　　　　　　　　4 Sheets-Sheet 3

RICHARD W. MAY
HORST M. SCHWEIGHOFER
INVENTORS

BY John J. Rogan
ATTORNEY

RICHARD W. MAY
HORST M. SCHWEIGHOFER
INVENTORS

BY John J. Rogan
ATTORNEY

Patented July 19, 1949

2,476,673

UNITED STATES PATENT OFFICE 2,476,673

SHAFT POSITIONING CONTROL SYSTEM

Richard W. May and Horst M. Schweighofer, Cedar Rapids, Iowa, assignors to Collins Radio Company, Cedar Rapids, Iowa, a corporation of Iowa Application October 2, 1947, Serial No. 777,426

13 Claims. (Cl. 318—33)

This invention relates to shaft positioners, and more especially to arrangements for selectively controlling the angular setting of a rotary shaft.

A principal object of the invention is to provide a system for remotely and electromechanically positioning a rotatable shaft or element in any one of a large number of angular positions, while employing a minimum number of control wires between the controlling and controlled units.

Another object is to provide an improved form of circuit-seeking switch system for remotely controlled apparatus and the like.

A feature of the invention relates to an arrangement for remotely controlling the selective positioning of a rotary shaft, by employing a set of interconnecting control wires which are arranged to be connected in permuted combinations, each combination representing one particular automatic setting for said shaft.

Another feature relates to an improved permutation wire switching control arrangement, including a simplified rotary switch with power driving and stopping mechanism for accurately positioning a rotatable driven member in unison with the rotary switch.

Another feature relates to a novel form of hunting switch employing a plurality of cam-like members and cooperating circuit control contacts, whereby the number of control wires between the controlling unit and the controlled unit can be considerably reduced.

A still further feature relates to the novel organization, arrangement and relative interconnection of parts which cooperate to provide an improved automatic shaft-positioning control system.

Other features and advantages not specifically enumerated will be apparent after a consideration of the following detailed descriptions and the appended claims.

In the drawing, which represents certain preferred embodiments,

Fig. 3 is a modification of the system of Fig. 1.

Fig. 4 is a detailed front view of one of the wafer switches of Fig. 3.

Fig. 5 is a sectional view of Fig. 4, taken along the line 5—5 thereof.

Fig. 6 is a detailed view of the rotor of Fig. 4.

Figures 1, 2:
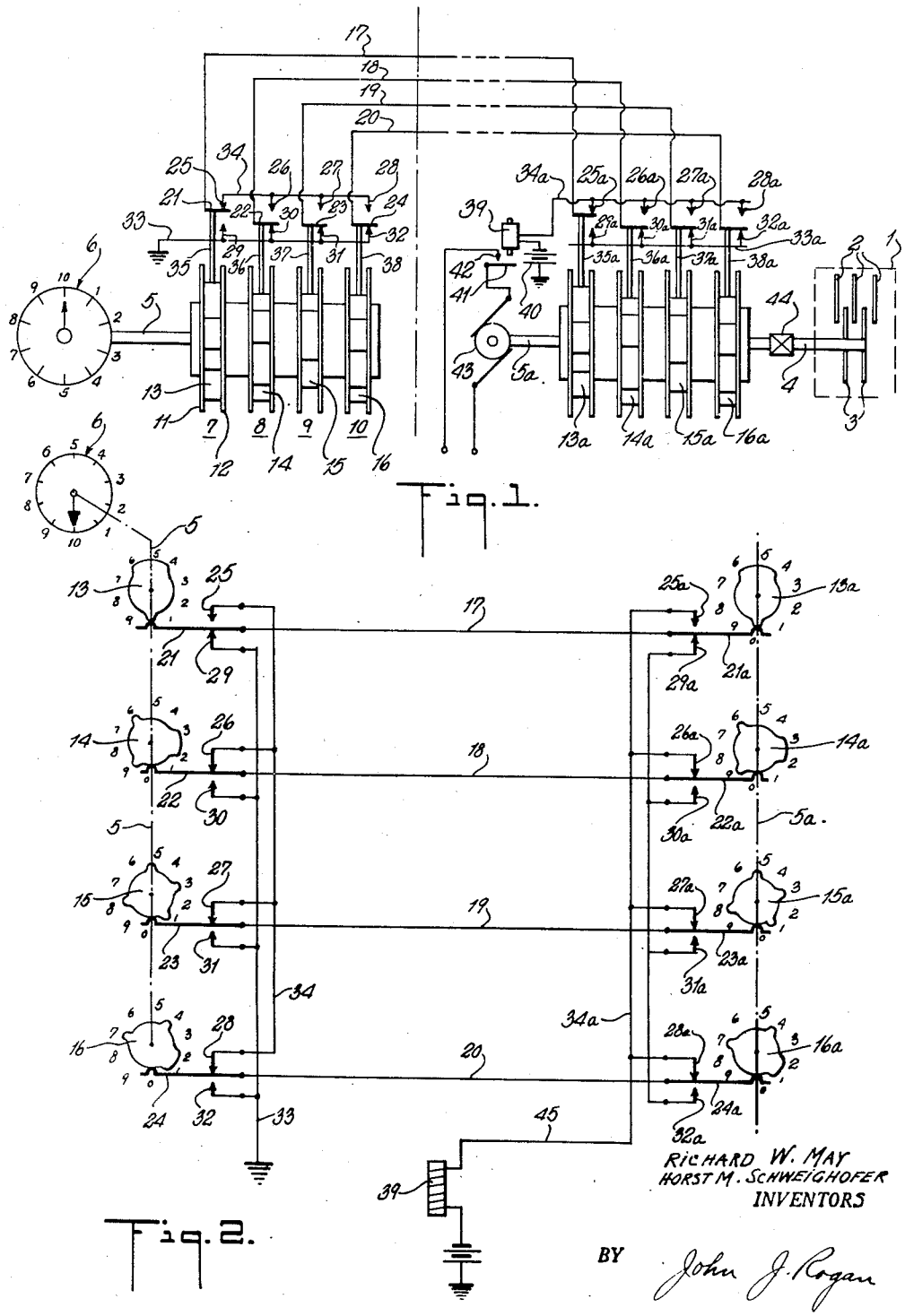
Fig. 1 is a composite structural and wiring diagram of a shaft-positioning arrangement according to the invention.
Fig. 2 is an equivalent schematic diagram of the system of Fig. 1.

Referring to Fig. 1, there is represented generically by the dotted rectangle 1, any well-known form of tuning unit or similar device such as is employed in radio sets and the like. Merely for simplicity, this device is shown as comprising a variable condenser having the usual stator plates 2 and the usual interleaved rotor plates 3. The shaft 4 which controls the rotary position of the plates 3, is referred to herein, as the shaft to be controlled. It will be assumed, for purposes of explanation, that the shaft 4 is to be selectively positioned in any one of ten different angular settings, it being understood of course that a greater or less number of settings can be controlled, as will appear from the following detailed descriptions. The controlling station is represented to the left of the dot-dash line in Fig. 1, and comprises a manually rotatable shaft 5 to which is fastened at one end an indicator dial 6 which is arranged to be turned to any one of ten different angular positions. Also fastened to shaft 5, for rotation as a unit therewith, is a cam barrel unit consisting of four cams 7, 8, 9, 10. These cams are preferably made of insulating material, and each may consist of a pair of spaced insulator discs 11, 12, between which are fastened the respective insulator cam members 13, 14, 15, 16. These cam members which are shown in developed form in Fig. 2, are so cut and mounted around shaft 5, so as to control the selective grounding or ungrounding of the control wires 17, 18, 19, 20, in various combinations. For this purpose, each of the control wires 17—20 is connected to a respective movable contact arm 21, 22, 23, 24. Mounted in spaced relation on opposite sides of said contact arms, are respective front contacts 25, 26, 27, 28, and respective back contacts 29, 30, 31, 32. Each of the contact points 29—32 is connected to a common grounded wire 33, and the front contacts 25—28 are connected to a common ungrounded wire 34. The contact arms 21—24 are arranged to be moved either into engagement with their respective front contacts or their respective back contacts, under control of the associated cam 13—16. For this purpose, each of the arms 21—24 carries a respective operating member 35, 36, 37, 38, the free ends of which are adapted to engage the cams 13—16. Preferably the arms 21—24 are spring-biassed so as to maintain the members 35—38 in spring-pressed contact with the respective cams.

At the controlled station, shown at the right of Fig. 1, there is a similar contact set and associated control cam barrel. This cam barrel consists of four rotary cams 13a, 14a, 15a, 16a, which are preferably of insulating material, and each is arranged to actuate a corresponding contact operating arm 35a—38a. The arms 35a—38a carry the movable contact arms 21a—24a. Associated with the respective contact arms 21a—24a are respective front contacts 25a—28a, and respective back contacts 29a—32a. The back contacts 29a—32a are connected to a common ungrounded wire 33a. The front contacts 25a—28a are connected to a common wire 34a which is connected through the winding of a suitable motor control relay 39, and thence to the grounded battery 40. The relay 39 has an armature 41 and a front contact 42 which control the power circuit of a suitable electric motor 43. Motor 43 is coupled to the shaft 5a which carries the cams 13a—16a. The shaft 5a is also connected through suitable reduction gearing 44 to the shaft 4 to be controlled. Thus, as long as the relay 39 is energized, it maintains motor 43 in operation, and the shaft 4 continues to rotate until the wire 34a becomes ungrounded.

The arrangement is such that each angular position of shaft 5a and of shaft 4 is represented by any one of ten grounded and ungrounded combinations of the wires 17—20. However, the operation of relay 39 is controlled not only by the grounded condition of the wires 17—20, but also by the angular position of the cams 13a—16a. The cams 13a—16a are cut similar to the cams 13—16; cam 13 has a high point at positions 4, 5, 6, 10, and a low point at positions 1, 2, 3, 7, 8, 9; cam 14 has a high point at positions 2, 3, 6, 9, and a low point at positions 1, 4, 5, 7, 8, 10; cam 15 has a high point at positions 1, 3, 5, 8, and a low point at positions 2, 4, 6, 7, 9, 10; cam 16 has a high point at positions 1, 2, 4, 7, and a low point at positions 3, 5, 6, 8, 9, 10. In the particular setting shown in Fig. 2, it will be assumed that the dial 6 has been previously rotated to position #10 so that the cam 13 causes contact arm 21 to engage contact 29, thus applying ground to the wire 17. In this setting, the cams 14, 15 and 16 are in their low positions, with the result that contact arms 22, 23, 24, are in engagement with their respective contacts 26, 27, 28. Thus ground is removed from wires 18, 19, 20. If the shaft 5a is already in the #10 position (as shown in Fig. 2), the cam 13a holds contact arm 21a out of engagement with contact 25a, so that the circuit of motor control relay 39 remains open and the shaft 5a remains in its #10 position. If, however, the shaft 5a is not in #10 position when dial 6 is set as above described, the cam 13a will be in some other position than the one shown in Fig. 2, and therefore the ground on wire 17 will be extended through contacts 21a and 25a to the winding of relay 39. The motor 43 therefore continues rotating shaft 5a until cam 13a opens the circuit at contacts 21a and 25a. Assume that a new setting is desired for shaft 5a, for example position #1. For this purpose, dial 6 is turned to position #1, in which setting, cams 13 and 14 are in their low positions, but cams 15 and 16 are in their high positions. As soon as dial 6 is turned therefore, contacts 23 and 31 close, and contacts 24 and 32 close, thus grounding wires 19 and 20. However cam 13 disengages its contact spring 21 from contact 29, so that the wires 17 and 18 are ungrounded. However, since the cams 15a, 16a are in their previously set position (as shown in Fig. 2) at the time dial 6 is turned for the new setting, the ground on wires 19 and 20 is extended through contacts 23a—27a and 24a—28a, to maintain the relay 39 energized. Therefore shafts 5a and 4 continue to rotate until the conductor 34a becomes ungrounded. Therefore, by appropriate design of the high and low portions of the cams 13—16 and 13a—16a, the circuit of relay 39 will be opened for ten different selective settings of the shaft 4 in accordance with the following table, wherein the letter G represents grounding of the appropriate conductor.

| Conductor | Selective Positions of Shaft 4 | | | | | | | | | |
|---|---|---|---|---|---|---|---|---|---|---|
| | 1 | 2 | 3 | 4 | 5 | 6 | 7 | 8 | 9 | 10 |
| 17 | | | | G | G | G | | | | G |
| 18 | | G | G | | | G | | | G | |
| 19 | G | | G | | G | | | G | | |
| 20 | G | G | | G | | | G | | | |

It will be understood, of course, that the cams 13a—16a are the same in construction as the cams 13—16, and are oriented around shaft 5a to correspond with the orientation of the cams 13—16 around shaft 5. Thus, for any given one of the ten positions of dial 6, there is only one position for shaft 4 where the circuit of relay 39 remains open. In other words, the opening of the motor circuit is a function not only of the selective grounding of the wires 17, 18, 19, 20, in various combinations by means of cams 13—16, but it is also a function of the rotational setting of cams 13a—16a. From the foregoing it will be seen that when the shaft is in any one of its ten selective settings corresponding to a setting of dial 6, the motor control relay 39 is not energized, and the shaft 4 remains in this set position. As soon as dial 6 is turned to a new setting, the motor circuit is immediately closed and the shaft 4 begins to rotate to seek the particular position at which the cams 13a—16a in conjunction with cams 13—16, maintain the circuit of relay 39 open.

Referring to Figs. 3–9, there is shown a modification of the system of Fig. 1. In this embodiment, the controlling unit is shown to the left of the dot-dash line, and the controlled unit is shown to the right of the dot-dash line. The controlling unit comprises a manually operable dial 46 attached to a shaft 47, which in turn is attached to the rotor 48. The rotor 48 consists of a disc 49 of insulation material which has attached to opposite faces the commutator rings 50, 51, which are provided with respective cam-like peripheries or teeth. The rotor disc 49 is mounted for rotation within a central circular opening in the stator disc 52. Attached to the periphery of the stator 52 are four stationary brushes 53, 54, 55, 56. As shown more clearly in Fig. 5, each of the brushes 53—56 has a portion extending on opposite sides of the stator, so as to be engaged respectively by the commutator rings 50, 51, as they are rotated. This type of switch construction is well-known in the radio art wherein it is known as a wafer-type switch. It will be understood, of course, that the invention is not necessarily limited to this type of switch construction. The brushes 53—56 are spaced apart around the commutator rings 50 and 51 which are so cut that the brushes 53—56 are grounded in permuted combinations. For this latter purpose, a grounding brush 57 is in continuous wiping engagement with the commutator ring 50. It will be assumed that the rotor 49 is arranged to be turned by dial 46 to 14 equally spaced settings, as a result of which the brushes 53—56, and therefore conductors 69—72, will be grounded in accordance with the following table, wherein the letter G represents grounding of the appropriate conductor:

| Conductor | Selective Positions of Shaft 47 | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| 69 | G | G | G |   |   | G |   |   |   | G | G |   | G |   |
| 70 |   | G | G | G |   |   | G |   |   |   | G | G |   | G |
| 71 | G |   | G | G | G |   |   | G |   |   |   | G | G |   |
| 72 |   | G |   | G | G | G |   |   | G |   |   |   | G | G |

Figure 7:
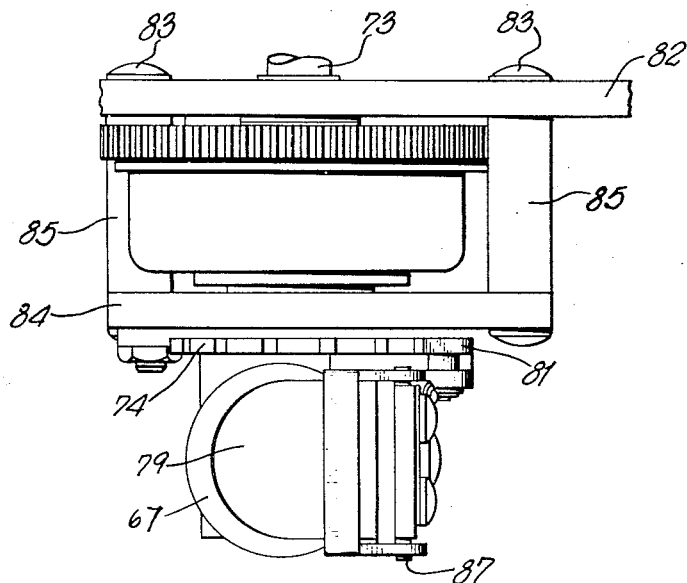
Fig. 7 is a top plan view of the motor control and stopping unit schematically illustrated in Fig. 3.
Figure 8:
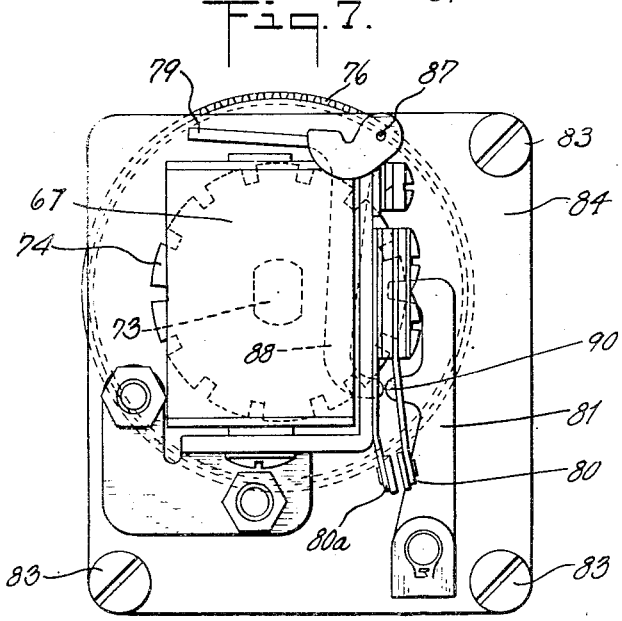
Fig. 8 is a front view of Fig. 7.
Figure 9:
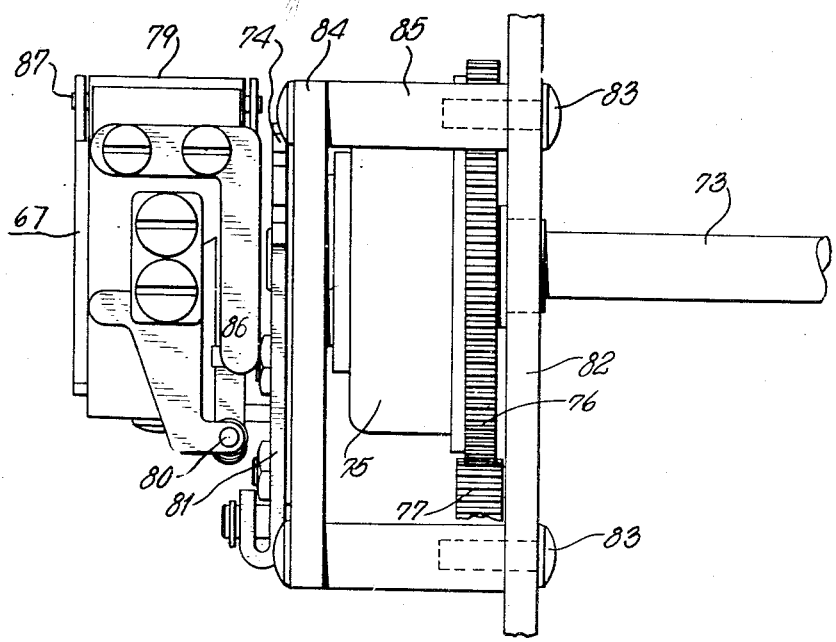
Fig. 9 is a right-hand side view of Fig. 7.

At the controlled unit or station, there is provided a similar rotary switch of the wafer-construction type comprising the stator disc 58 of insulating material, to which are fastened the brushes 59, 60, 61, 62. The rotor of this switch comprises the insulator disc 63 carrying on opposite faces the commutator rings 64, 65, which have the same cut peripheries as the corresponding cut peripheries of the commutator rings 50 and 51 above described. The stator 58 also has attached thereto a wiper brush 66 which is connected through the winding of motor control relay 67 to the grounded battery 68. The brushes 53—56 of the controlling unit are connected by control wires 69, 70, 71, 72, to the corresponding brushes 59—62 of the controlled unit. The rotor 63 is fastened for example by keying to the shaft 73, which shaft is to be selectively positioned in any one of the fourteen settings determined by dial 46. Shaft 73 has also fastened thereto a toothed stopping wheel 74, and this shaft is also coupled through a slip-friction clutch 75, and thence through the gears 76 and 77, to the electric driving motor 78. The power circuit for motor 78 is controlled by the armature 79 and the cooperating contacts 80 and 80a of relay 67. Armature 79 also operates a pawl or detent 81 which cooperates with the teeth on wheel 74 so as positively to stop the shaft 73 when the relay 67 is deenergized. The elements 67, 74, 75, 76, 79, 80 and 81 can form a unitary assembly which is shown in Figs. 7, 8 and 9. The elements of these three figures, which are identical with the corresponding elements of Fig. 6, are designated by the same numerals. The unit can be mounted on a suitable bracket or plate 82 by means of fastening bolts 83. The shaft 73 extends through the plate 82 and through another plate 84 which is fastened in spaced relation with respect to the plate 82 by spacer sleeves 85. The left-hand end of shaft 73 (Fig. 9) has fastened thereto the toothed wheel 74. The slip-friction clutch 75 has one element fastened to the driving gear 76 which is in mesh with another gear 77 driven by motor 78. The other element of the slip-friction clutch is fastened to shaft 73. Pivotally attached to the plate 84 is the pawl or detent 81, which may be spring-pressed, for example, by spring 86, so as to maintain its opposite end in stopping engagement with the toothed wheel 74. The motor control relay 67 is suitably attached also to the plate 84, and its armature 79 is pivotally mounted on a suitable bracket 87, so that when the armature 79 is attracted by the relay 67, the armature extension 88 closes the circuit between the contacts 80 and 80a. Likewise, when the relay 67 is energized, the armature extension 88 engages the projection 90 on the pawl 81 to hold it out of engagement with the stopping wheel 74. On the other hand, when the relay 67 is deenergized, the contacts 80 and 80a are opened, and at the same time the pawl 81 engages the stopping wheel 74 to stop further rotation of shaft 73. The motor 78 can therefore coast to rest without disturbing the set position of shaft 73 because of the slip-friction clutch 75.

From the foregoing descriptions it will be seen that it is possible to automatically set the shaft in a comparatively large number of settings equal to $(2^n-1)$ where "$n$" is the number of control wires interconnecting the controlling and controlled units.

What is claimed is:

1. An automatic shaft-positioning arrangement of the type described, comprising a controlled unit for the shaft which is settable to any one of a series of selective positions, a controlling unit for selecting any one of said settings, a plurality of control wires interconnecting the controlling and controlled units the number of said wires being substantially less than the total number of said settings and bearing the relation $(2^n-1)$ where "$n$" is the number of interconnecting control wires, a plurality of sets of switching contacts for the controlling unit there being one such set for each of said wires, an equal number of sets of switching contacts for the controlled unit, electric motor means for operating the controlled unit and for simultaneously operating said shaft, said controlling unit including a rotatable member for setting the switching contacts of the controlling unit in different permuted combinations, said controlled unit also including a rotatable member for setting the switching contacts of the controlled unit in different permuted combinations, and circuits for maintaining said shaft in rotation until the permuted combinational setting of the switching contacts of the controlled unit corresponds to the desired setting of said shaft.

2. An automatic shaft-positioning arrangement of the type described, comprising a controlled unit for the shaft which is settable to any one of a series of selected positions, a controlling unit for selecting any one of said settings, a plurality of control wires interconnecting the controlling and controlled units the number of said wires being substantially less than the total number of said settings in accordance with the relation $(2^n-1)$ where "$n$" is the number of interconnecting control wires, a plurality of sets of switching contacts for the controlling unit there being one such set for each of said wires, an equal number of sets of switching contacts for the controlled units, a rotatable cam barrel having a plurality of cams for respectively operating the switching contact sets of the controlling unit, another cam barrel having a plurality of rotatable cams for respectively operating the switching contact sets of the controlled unit, electric motor means for operating the controlled unit and for simultaneously operating said shaft, manual means for positioning the cam barrel of the controlling unit to set the switching contacts thereof in different permuted combinations, and circuits rendered effective in response to a manual setting of the cam barrel of the controlling unit to operate said motor and the cam barrel of the controlled unit until the permuted combinational setting of the switching contacts of the controlled unit corresponds to the desired setting of said shaft.

3. An automatic shaft-positioning arrangement of the type described, comprising a controlling unit, a controlled unit, each of said units having an equal number of switching contact sets, an equal number of control wires interconnecting the contact sets of said units, manual means to operate the contact sets of the controlling unit in different permuted combinations, automatic means including electric motor means to operate the switching contact sets of the controlled unit in different permuted combinations, and a control circuit for said motor means which is maintained closed until the permuted setting of the switch contact sets of both units bear a predetermined relationship, the relation between the number of selective positions of said controlled unit and the number of said interconnecting control wires being $(2^n-1)$ where "$n$" is the number of said control wires.

4. An automatic shaft-positioning arrangement of the type described, comprising a first manually rotatable cam barrel arranged to be selectively moved to any one of a number of selective positions, a second automatically rotatable cam barrel, each of said barrels having a similar set of rotary cams, a plurality of contact sets one for each of the cams of the first barrel, another plurality of contact sets one for each of the cams of the second barrel, each of said contact sets including at least one stationary contact and a cooperating shiftable contact which is operated under control of a respective one of the cams, a set of control wires interconnecting the shiftable contacts of the contact sets associated with each barrel, a motor control relay connected to the stationary contacts of the contact sets for the second barrel, an electric motor controlled by said relay for rotating the second cam barrel, and means including said relay for maintaining said motor in operation until the setting of the contact sets for the second barrel bears a predetermined permuted combinational relation with respect to the setting of the contact sets for the first barrel, the relation between the maximum number of selective settings of said second cam barrel and said interconnecting control wires being $(2^n-1)$ where "$n$" is the number of said control wires.

5. An automatic shaft-positioning arrangement of the type described, comprising a controlling switch unit, a seeking switch unit, each of said units having similar sets of stationary and movable contacts, rotor means for each unit for operating the movable contacts thereof into engagement with the stationary contacts in permuted combination said rotor means having a maximum number of selective stopping positions, a set of control wires connecting certain contacts of one unit with the corresponding contacts of the other unit, an electric motor for rotating the rotor of the seeking switch unit and also said shaft, and means including the contact sets of both units and said wires to maintain the seeking switch rotor and said shaft in rotation until the setting of the seeking switch rotor corresponds to the setting of the controlling switch rotor, the number of said selective positions of said rotor means and the number of said control wires being $(2^n-1)$ where "$n$" is the number of control wires.

6. An automatic shaft-positioning arrangement of the type described, comprising a manually settable controlling switch unit, an automatic seeking switch unit, each of said units having sets of stationary and movable contacts, rotor means for each unit for operating the movable contacts thereof into engagement with the stationary contacts said rotor means having a maximum number of selective stopping positions, a set of control wires connecting certain contacts of one unit with the corresponding contacts of the other unit, said controlling unit grounding said wires in permuted combinations, an electric motor for rotating the rotor of the seeking switch and also said shaft, a motor control relay having a winding whose energization is controlled by the setting of both units and which maintains said motor in operation until the seeking switch unit reaches a position determined by the setting of the controlling switch unit and the permuted grounding of said control wires, the number of said selective positions of said rotor means and the number of said control wires being $(2^n-1)$ where "$n$" is the number of control wires.

7. An automatic shaft-positioning arrangement of the type described, comprising a controlling switch unit, a seeking switch unit, each of said units having a set of stationary switching contacts and respective movable contacts, and rotor means for each switch for operating the moving contacts into engagement with the stationary contacts in permuted combinations said rotor means having a maximum number of selective stopping positions, a set of control wires connecting each stationary contact of one unit with the corresponding stationary contact of the other unit, an electric motor for rotating the rotor of the seeking switch unit and also said shaft, and means including the said switch contacts of both units and said wires to maintain the seeking switch rotor and said shaft rotating until the setting of the seeking switch rotor corresponds to the setting of the controlling switch rotor, the number of said selective positions of said rotor means and the number of said control wires being $(2^n-1)$ where "$n$" is the number of control wires.

8. Apparatus for selectively positioning a shaft in any one of a number of positions, comprising a controlling switch unit, a seeking switch unit, each of said units having a set of stationary switch contacts and respective movable contacts, a rotor for each switch for bringing the movable contacts into engagement with the associated stationary contacts in permuted combinations, a set of control wires connecting the stationary contacts of one unit with the corresponding stationary contacts of the other unit, means to set the rotor of the controlling unit in any one of a series of rotary positions corresponding to the desired position for said shaft, the maximum number of selective positions of said shaft being $(2^n-1)$ where "$n$" is the number of said interconnecting wires, an electric motor for rotating the rotor of the seeking switch unit together with said shaft, and means including the said switch contacts of both units and said wires to maintain the seeking switch rotor and said shaft in rotation until the setting of the seeking switch rotor corresponds to the setting of the controlling switch rotor.

9. Apparatus for selectively positioning a shaft in any one of a number of positions, comprising a seeking switch having a plurality of stationary contacts and respective movable contacts, a set of control wires connected to each of said stationary contacts, means to ground said wires in permuted combinations, each combination representing a particular selective position for said shaft, a rotor for said switch for bringing the movable contacts thereof into engagement with the associated stationary contacts said rotor having a maximum number of selective stopping positions, an electric motor for rotating said rotor and said shaft, a normally open motor control circuit, means including said movable and stationary contacts and said control wires for maintaining said motor control circuit closed until said rotor finds a position where none of the grounded control wires completes said motor control circuit, the relation between the number of positions of said rotor and said control wires being $(2^n-1)$ where "$n$" is the number of control wires.

10. Apparatus for selectively positioning a rotary shaft in any one of a number of positions, comprising a plurality of stationary contacts, a movable contact for each of said stationary contacts, a set of control wires each connected at one end to a corresponding one of said movable contacts, means connected to the opposite ends of said wires to ground them in permuted combinations, a plurality of operating cams one for each movable contact for setting the movable contacts in any one of $(2^n-1)$ permuted combinations against said stationary contacts where "$n$" is the number of control wires, a motor for rotating said shaft and also for rotating said cams, a relay for controlling said motor, an electric power source for said relay, said relay having one terminal of its energizing circuit connected in parallel to said stationary contacts, the other terminal being connectable to said power source.

11. Apparatus according to claim 10 in which the energizing circuit for said relay remains closed until the permuted setting of said movable contacts and the permuted grounding of said wires provides no return circuit for said relay.

12. Apparatus according to claim 10 in which the means for grounding said wires in permuted combinations comprises rotary and manually settable switch means having sets of movable and stationary contacts, together with means for closing the circuits between the movable and stationary contacts in permuted combinations.

13. An automatic shaft-positioning arrangement of the type described, comprising a controlling unit, a controlled unit, each of said units having an equal number of switching contact sets, an equal number of control wires interconnecting the contact sets of the units, manual means to operate the contact sets of the controlling unit in different permuted combinations, automatic means including an electric motor to operate the switching contact sets of the controlled unit in any one of $(2^n-1)$ different permuted combinations where "$n$" is the number of control wires, a control circuit for said motor which is maintained closed until the permuted setting of the switch contact sets of both units bear a predetermined relationship, said motor being coupled to said shaft through a slip-friction clutch, a toothed stop wheel fastened to said shaft, and said control circuit includes an electromagnetic relay having an armature which opens and closes the motor circuit and a pawl which engages the recesses in said toothed wheel to positively stop said shaft immediately when it has reached its selected position, said pawl being out of said recesses while said shaft is being moved to its selected position.

RICHARD W. MAY.
HORST M. SCHWEIGHOFER.

REFERENCES CITED

The following references are of record in the file of this patent:

UNITED STATES PATENTS

| Number | Name | Date |
| --- | --- | --- |
| 1,042,692 | Kramer | Oct. 29, 1912 |
| 1,042,693 | Kramer | Oct. 29, 1912 |
| 1,777,796 | Hubbell | Oct. 7, 1930 |
| 2,406,848 | Novak | Sept. 3, 1946 |